United States Patent
Mitchell et al.

(10) Patent No.: US 7,678,403 B2
(45) Date of Patent: Mar. 16, 2010

(54) WHOLE GRAIN NON-DAIRY MILK PRODUCTION, PRODUCTS AND USE

(75) Inventors: Cheryl Mitchell, Stockton, CA (US); James B. Mitchell, Manteca, CA (US)

(73) Assignee: CRM IP LLC, Stockton, CA (US)

( * ) Notice: Subject to any disclaimer, the term of this patent is extended or adjusted under 35 U.S.C. 154(b) by 1141 days.

(21) Appl. No.: 11/182,145

(22) Filed: Jul. 15, 2005

(65) Prior Publication Data
US 2007/0014892 A1    Jan. 18, 2007

(51) Int. Cl.
*A23L 1/10* (2006.01)
*A23L 2/38* (2006.01)

(52) U.S. Cl. .......................... 426/590; 426/21; 426/44; 426/518; 426/520; 426/618

(58) Field of Classification Search ................ 426/21, 426/44, 590, 518, 520, 618, 74, 620, 615, 426/640, 639, 658
See application file for complete search history.

(56) References Cited

U.S. PATENT DOCUMENTS

| | | | |
|---|---|---|---|
| 4,677,065 A * | 6/1987 | Buchbjerg et al. | ......... 435/68.1 |
| 4,744,992 A | 5/1988 | Mitchell et al. | |
| 4,894,242 A | 1/1990 | Mitchell et al. | |
| 6,737,099 B2 | 5/2004 | Guraya | |
| 2004/0213890 A1 | 10/2004 | Servotte | |

FOREIGN PATENT DOCUMENTS

JP    61-019450    *    1/1986

* cited by examiner

*Primary Examiner*—Helen F Pratt
(74) *Attorney, Agent, or Firm*—The Halvorson Law Firm

(57) ABSTRACT

A method comprising selection of unbroken whole grain rice that are first washed, or whole grain corn that is first reduced in size, and then making an aqueous slurry that is subsequently wet milled to release all the protein, fat, fiber, and starch components normally held in the structure of the grain. The resulting slurry can be reacted with heat to gelatinize the starch and the subsequent product dried. Also, the heated slurry containing the liberated components can be treated to enzymatic hydrolysis via the process of liquefaction and optionally saccharification, producing whole grain rice milk products having diverse carbohydrate compositions. The whole grain milk products are characterized by a nutritional composition containing substantially all the nutritional components of the whole grain, being an opaque whole milk colloid, having smooth texture versus pulpiness, lacking in all bitterness normally associated with whole grain products, and having a variety of sweetness levels from non-sweet to very sweet.

36 Claims, No Drawings

WHOLE GRAIN NON-DAIRY MILK PRODUCTION, PRODUCTS AND USE

FIELD OF THE INVENTION

The present invention relates to a novel method as well as the products of this method, for producing milk-like liquid concentrates and dried powder ingredients, or syrups, from whole grain corn and rice, and the use of these ingredients in the manufacture of beverage or food products.

BACKGROUND OF THE INVENTION

The traditional Japanese method for the preparation of a nutritional, non-alcoholic beverage from rice requires the blending of steamed or cooked rice with rice koji. The rice koji is prepared by inoculating steamed or cooked rice with the spores of the mold (*Aspergillus oryzae*) and cultivating the inoculated rice.

After cultivation or fermentation for periods between 4 and 48 hours, the saccharified mass is passed through a sieve or filter. Dependent upon the starting materials used, (polished or unpolished rice or combination thereof) the filtrate is a white to beige colored slurry having a distinctly sweet, rice-like taste. The texture and sweetness of the slurry is determined by the total solids and the degree of starch conversion and may be mildly sweet or thick and sweet (similar to a milk-shake). This nutritional beverage prepared from rice is commonly termed amazake.

Amazake may be made from brown rice or white rice. By definition, white rice is brown rice which has had the outer bran layer removed by polishing. The bran layer contains proteins, predominantly all the oil found in rice, fiber, vitamins and minerals. The bran layer is considered to have significant nutraceutical and nutritional value. Unfortunately the bitter taste and "pulpy" texture resulting from the bran layer and endosperm fiber, limits the usage of brown rice as compared to white rice. Current terminology as set forth by the USDA and the Whole Grains Council, establishes the term "whole grain" as referring to the whole grain including the endosperm and bran layer and any products containing whole grains as having "substantially all the nutrient value found in the whole grain inclusive of the bran and endosperm components". In the patents of Mitchell et al., (U.S. Pat. Nos. 4,894,242 and 4,744,922 the term "whole grain" was used to distinguish head rice from rice having a reduced particle size such as brewers, brokens, or flour. However, these patents also specified the use of "brown or white" whole grain. Such use of the term, "whole grain white rice" is currently inconsistent with the current and common use of the term "whole grain" since white rice does not contain the bran layer and therefore is not a whole grain by the present definition. Definitions for brown rice, head rice, broken rice or brewers rice can be obtained from the USDA, and are herein incorporated by reference.

The amount of sweetness derived from the amazake is dependent upon the total solids of the liquid and the amount of time the rice is allowed to culture with the koji under optimum conditions. Sweet amazake products resulting from long culturing times have an inherent problem of developing considerable sweetness as well as a "flat" or "sour" flavor. This flat souring presumably is the result of microbial action in the nutrient rich media as well as the oxidation of fats naturally occurring in the rice.

In some cases, culturing is terminated prior to the development of this flat souring. However, this reduces the sweetness by limiting the amount of conversion of rice starch to sugars such as glucose and maltose, and results in a slurry that is thick and more like a milk-shake in texture.

The use of enzymes as an alternative method for the liquefaction and saccharification of starch from grains and tubers other than rice is very well known for the production of 100% carbohydrate products including dextrins, fillers and sweeteners intended to be competitive with sucrose. In these products, usually made from corn, the starch-containing portion of the grain or tuber is first separated from the non-starch containing portions before enzymatic conversion. Thus, a relatively pure starch is obtained which can be enzymatically converted and processed to produce a pure carbohydrate product free of impurities.

Because of the preliminary separation of the starch fragment from the grain, not only is a pure carbohydrate product obtained but the enzymatic conversion process is uncomplicated and uninhibited by the fat, fiber and protein contaminants. Unfortunately, this enzymatic conversion process yields a relatively pure carbohydrate product and therefore does not have the nutritional advantages yielded by the traditional koji method involving whole or ground rice. The separation of the starch fraction of whole rice from the other nutritional components has been described in the literature.

One method for the separation of the protein and starch from rice grains was provided by Guraya (U.S. Pat. No. 6,737,099) who taught the use of high pressure homogenization to de-agglomerate protein and starch from amylaceous flours of cereals and beans in an aqueous slurry. The liquid products resulting from this methodology is a homogenous dispersion of individual protein and starch granules, which may readily be separated from each other by centrifugation. Additionally, these components of protein and starch may be spray dried together to achieve a protein coated starch. The technology by Guraya makes no mention of the formation of the fat-amylose complex or opaque suspension, and it can be assumed that the nature of the high pressure homogenizer not only de-aggregated the protein-starch aggregates but also the fat-amylose aggregates which are considerably weaker than the protein-starch aggregates.

Guraya does not teach any technology associated with the heating and enzymatic hydrolysis of the deaggregated protein and starch slurry resulting from high pressure homogenization of flours, but rather of the separation, isolation, and functionality of the uncooked starch and unheated protein component, and the possible recombination of these refined and deaggregated protein and starch components prior to spray drying.

Examples of beverage products developed for the Non-Dairy Milk market, include soy beverages which have been employed recently as a milk substitute in powdered, canned and aseptic packaged form. Disadvantages associated with these soy-based milk substitutes arise primarily because of the allergenic response that many people have toward soy products, the bean-like flavor of the products, and their common need for the addition of a sweetener. However, the high protein content of the soy beverage products has been a distinct advantage.

Other Non-Dairy Milk beverage products include composites and mixtures of flours, in particular rice flour in combination with maltodextrin, oils, and carbohydrates. The latter type product was disclosed by Servotte, Yves in U.S. Patent Application No. 2004021390. These blends as well as traditional Mexican beverages referred to as "Horchata", are blends of the more refined ingredients including oil, glucose syrup, and maltodextrin that are added separately to the rice flour. These products are not whole grain nor do they contain substantially all of the nutrients found in whole grains. Additionally, the primary sweetness does not result from the enzymatic hydrolysis of the flour but rather from the sugar or glucose syrup that is added.

In U.S. Pat. Nos. 4,744,992 and 4,894,242, both issued to Mitchell et al., a nutritional rice milk is disclosed, which is produced using ground rice particles from white or brown rice. An aqueous slurry of the rice particles is heat treated with alpha-amylase enzyme (with and without the presence of protease) to achieve liquefaction and subsequently treated with glucosidase enzyme in a saccharification step. The aqueous heat treatment of the divided rice particles results in the irreversible binding of the fiber to the insoluble protein fraction that is subsequently and easily removed by sifting to result in the claimed product having less than "3.5% protein on a dry weight basis". The latter product constitutes less than 50% of the protein available in the whole grain rice. These slurries resulting from the Mitchell process still retain an unwanted bitter taste as well as an undesirable "sweetness" that results from the required glucosidase during saccharification. Additionally, the Mitchell slurries, after removal of the protein and fiber pulpy aggregate to yield the claimed milk-like character and reduced protein content, have a significantly lower protein and fiber content than what is reported for whole grain brown rice. The products resulting from the Mitchell technology more closely resemble a translucent, non-fat, sweetened milk product even after homogenization with added oil.

Accordingly, there has been found to remain a need for improved rice liquids that can be employed either as a beverage or in the preparation of food products and that have a taste that is less sweet, less bitter, or less pulpy than what has been available from the rice milk beverages resulting from the Mitchell et al. patent (marketed as Rice Dream), or the more traditional form of the amazake or composite mixtures such as the Horchata. Because of the generally non-allergenic response to rice, it may be anticipated that such products may have a similar characteristic of being generally non-allergenic. Additionally, and more importantly, recent trends in the food industry (including the USDA food pyramid) have also emphasized the need for individuals to consume at least three servings of whole grains, or products containing whole grains, per day. The products of Mitchell et al., or the traditional Horchata, contain only a small fraction of the protein, fiber, vitamins and oil found in white or brown rice from which they are manufactured. Amazake products are too sweet or have a bitter aftertaste and are too pulpy resembling more a milkshake. Therefore, there still remains a need for a non-sweet, non-bitter, non-dairy, milk-like product made from hypoallergenic whole grains that retain substantially all of the nutritional components of whole grains such as brown rice or corn.

SUMMARY OF THE INVENTION

It is an object of the invention to provide such an improved liquid, hereinafter referred to as a "whole grain milk", being made from either rice or corn, having a greater opacity and milk like character similar to full fat whole milk without any added oil, and having substantially all of the nutritional properties of whole grains such as brown rice or corn, without the bitter taste associated with these whole grains, and surprisingly also retaining protein functionality such as the protein function of foaming.

It is also an object to provide a method for producing the improved whole grain rice-milk and wholegrain corn-milk.

It is also an object to use a modification of the method for producing the whole grain rice-milk and whole grain corn-milk, to produce a whole grain milk type product that also has the property of increasing viscosity when dissolved in an aqueous solution.

It is also an object to use a modification for producing whole grain rice-milk and whole grain corn-milk to produce a derivative of the whole grain rice or corn product having reduced fiber, protein, or fat content than the whole grain milk product that can be further concentrated to form a syrup.

It is further an object of this invention to use the whole grain milk products of this invention as ingredients in the manufacture of novel food and beverage products having substantially all the nutritional value of whole grain without the recognized texture and bitter properties of the whole grain.

It is a further object of this invention to use the derivative products that may be formed from the whole grain milk products in the manufacture of novel food and beverage products having much of the nutritional value of the whole grain but without the bitterness associated with the whole grain.

Additionally, it is an object of this invention to use the corn or rice syrups manufactured by the methods of this invention in the manufacture of food and beverage products.

Accordingly, it is yet a further object of the invention to provide both a dried whole grain milk product, or derivative product optionally having the protein, fiber, or fat-amylose component removed, and their method of preparation.

It is a still further object to provide a whole grain milk product or its derivatives optionally employing liquefaction or saccharification techniques.

The novel features that are considered characteristic of the invention are set forth with particularity in the appended claims. The invention itself, however, both as to its structure and its operation together with the additional objects and advantages thereof will best be understood from the following description of the preferred embodiment of the present invention. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments of the invention is not intended to indicate a desire to invoke the special provision of 35 U.S.C. § 112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF THE PREFERRED EMBODIMENT

The present invention is useful for producing a whole grain non-dairy milk liquid, which can be used for beverages and other food products.

Generally, in the enzymatic conversion of the starch from grains such as corn, the grain is ground and the starch containing fragments of the grain are separated from the hull, germ and other grain portions before reaction with the added enzyme. In this way, contamination of the starch by other components in the grain, such as proteins, fats and fibers, is minimal and therefore processing is not complicated by these impurities. As a consequence of this preliminary starch separation, a purified carbohydrate product is produced having no non-carbohydrate based nutritional components that are normally found in the whole grain and whole grain based products such as the traditional koji preparation of amazake.

Milling whole brown rice releases the action of lipase enzymes that begin to work on the lipids in the bran layer of the grain. The action of lipase on the lipids or fats found in the bran result in bitter or rancid flavors. Prior art teaches the further subjecting of this dry milled whole grain particle to an aqueous slurry that is heated and enzymatically hydrolyzed, as taught in U.S. Pat. Nos. 4,744,992 and 4,894,242, using reaction parameters such as time, temperature, pH and water concentration of the ground grain slurry adjusted to obtain hydration and swelling of the ground grain particle thereof, liquefying the ground grain slurry, using alpha-amylase enzymes under optimum conditions to break down and dextrinize the starch completely with a minimum of starch retrogradation, and enzymatically saccharifying the liquefied slurry results in a pulpy rice slurry composed of a spongy fiber-protein aggregate and a translucent milk-like liquid having a bitter taste.

It is also known that while the use of whole grain polished white rice reduces the amount of bitterness found in the final product due to the diminished quantity of lipids available, there still exists some bitterness associated with the ricemilks made from white rice because residual ground rice bran, resulting from the polishing of brown rice to make white rice, rapidly becomes extremely rancid and bitter caused by the action of lipase on the fat and oils found in the residual ground rice bran.

In the present invention, we have found that the lipase enzyme may be readily removed or deactivated prior to its action on the fats contained in the bran layer by first gently washing the whole brown rice within 24 hours, and more preferably within 6 hours, of the whole brown rice being dehulled. This washing process is accomplished in an aqueous or alcohol environment and is performed very gently so as to minimize the marring or scratching of the surface of the bran, which releases the oil stored in the bran layer.

We have found that the bitter taste retained by prior art rice milk liquids results, in part, from enzymatic action of water soluble enzymes contained in the bran of the grain and remains even after the grain is polished. The act of grinding or otherwise breaking the surface of the bran layer of the grain, releases contained fat so that the enzyme, which is apparently on the surface of the bran layer, can react with the fat to produce bitter flavinoids. In the present invention it has been found that it is critical to start with unbroken whole grains, such as brown rice, and to wash the unbroken whole grain rice prior to any other processing step, especially any breaking or grinding step. In the present invention, grinding of any kind is performed after the wholegrain has first been washed and the lipase enzyme removed. After the whole grain has been washed and the soluble lipases removed, the grain is preferably ground in an aqueous slurry.

We have also discovered, to our amazement, that the wet milling of the whole washed grains in an aqueous slurry, at a temperature below the gelatinization temperature of starch or the denaturing of protein, more preferably at 75° F. or below, would eventually result in the release and liberation of substantially all the fat, protein, fiber, and starch components from the structure of the grain. These components, once liberated, were free to react in a manner totally different than the reaction that takes place when these same components are held within the constraints of the grain structure, even if the grain had been divided into smaller particles. We have found that the liberated fat, for instance, can react with the liberated amylose to form a fat amylose complex. This happening before enzymes can hydrolyze the amylose. Unexpectedly and to our amazement, this fat-amylose complex, which produces a desired cloudy or opaque white milk suspension, also resists enzymatic hydrolysis of the amylose and therefore remains even after enzymatic hydrolysis. We also found that by first liberating the fat and amylose so that they can react with each other, that the maximum amount of a desirable milk like complex could be produced resulting in an opaque white suspension as opposed to a translucent suspension of the prior art. We also found, to the distinct advantage of this product, that the fat-amylose complex once formed, is also resistant to oxidation thereby stabilizing the liberated fat that is present so that it cannot oxidize or react otherwise to form bitter flavinoids.

We have found that if the components of the whole grain are not first liberated prior to heating or enzymatic hydrolysis, the process of gelatinization and starch hydrolysis along with the denaturization of the proteins by heat, limits the reactions available to the components based on the structure of the grain. Upon heating the whole grain or divided particles in an aqueous slurry as described in the prior art, fiber-protein aggregates are formed which are pulpy in nature and extremely difficult to separate once the protein has denatured inter-twining itself around the fiber. The amylose, which is released during the heating process, has only limited opportunity to react with the fat prior to hydrolysis of the amylose by enzymes so that the amylose can no longer react with fat to form the desired fat-amylose complex.

We have also found that the liberated components, such as the protein and fiber, do not tend to react with each other during the heating or enzymatic process and instead tend to denature or bind to themselves. The resulting protein and fiber in the liquid slurry produce a texture that is much smoother and creamier and does not possess the spongy clumps of fiber-protein aggregate that is present in the prior art amazake or rice milk. Additionally, and to our amazement, the protein tended to retain much of its functionality and easily formed films and the ability to foam and froth similar to what you would expect from cows milk.

Subsequent enzymatic hydrolysis, if used, on the liberated components of the brown rice, was best performed at the natural pH of rice slurry, that is, about 6.3 or within a range of 6.0 to 6.5. In addition the pH may be adjusted for example, to an optimum level required by the enzyme. In either event, liquefaction alone or in combination with saccharification according to the invention results in an opaque milk-like product containing substantially all the nutrients found in whole brown rice, having a smooth texture with an absence of the spongy fiber-protein aggregate, is highly palatable and characterized by absence of a rice flavor or any bitter taste. We have also found, that by increasing the saccharifying enzyme dosage from two to ten times that necessary to convert an equivalent amount of purified starch and by maintaining enzyme reaction time of less than about four hours, a whole grain milk product can be produced having no sour flavor while exhibiting opacity associated with whole milk and substantially all the nutritional properties of brown rice.

In other words, the whole grain milk of the invention prepared by first washing the whole brown rice prior to any milling whatsoever, followed by the liberation from the whole grain in an aqueous slurry of the components from the rice grain structure, optionally removing some of the coarsest fiber, followed by heating and optionally enzymatic hydrolysis has a composition based on total solids as set forth in Table 1.

TABLE 1

From about 1.0-7% fiber;
From about 5-9% protein;
From about 3-5% fat; and
From about 0.3-0.6% ash
From about 80-82% starch based carbohydrates.

The carbohydrate component may exist as gelatinized starch and complex carbohydrates if the slurry is just heated to greater than 140° F. without any enzymatic hydrolysis. However, if the slurry is subjected to enzymatic hydrolysis, the resulting composition of carbohydrates based on total carbohydrates can be From about 0 to 70% glucose
From about 0 to 60% maltose, and
From about 10 to 99% complex carbohydrates By contrast, prepared amazake, Rice Milk, from the prior art has the following composition based on total carbohydrates has greater than 5% glucose, and higher saccharides that do not exceed 70%. Prior art amasake or RiceMilk, require enzymatic hydrolysis, which includes both liquefaction and saccharification, that results in the formation of simple sugars. In the present invention the enzymatic hydrolysis of the starch is not necessary to make a smooth milk like liquid. Additionally, if enzymatic hydrolysis is performed, only liquefaction may be utilized as opposed to a combination of liquefaction and saccharification. Therefore, again to our desired preference, the whole grain milk of this invention can have considerably less sweetness as compared with the amasake or RiceMilk of the prior art.

As noted above, the whole grain rice milk product, because of the selection of unbroken whole grains as a starting material, includes substantial nutritional values as were also discussed and summarized above. Accordingly, the preferred composition set forth above in Table I further comprises nutritional values that, according to the present invention, comprise fiber at from 1 to 7%; protein from 5 to 9%; fat from 3 to 5%; and ash or minerals at about 0.3 to 0.4 of the total solids. The non-carbohydrate (starch-based) components of this invention, which include fiber, protein, fat, and ash equals at least to 9% minimum non-carbohydrate component, are compared to less than 5% total non-carbohydrate (starch-based) components as described by the prior art of Mitchell et al. The latter in combination with the absence of the pulpy protein-fiber aggregate and absence of all bitter taste clearly distinguishes the product of this invention from any prior art.

In the process of this invention, it is critical that unbroken whole grain rice is used. Steamed or cooked rice material, selected from the group consisting of polished, partially polished, broken, ground, chipped or any combination thereof, is unsuitable and will not work for the present invention. It is realized that there may be some slight amount of broken or chipped rice in any given batch of dehulled rice and it has been found that there may be no more than 30% of the contents broken or chipped; preferably no more than 10%, more preferably, no more than 5%; most preferably no more than 2%. The unbroken whole grain rice is gently washed in a solvent that solublizes lipase enzyme, such as water, ethanol or the like. It is important that the wash step is a gentle so that one does not damage the outer surface of the rice grain, thus prematurely releasing the oil from the bran layer. Preferably the washing step is for an amount of time effective for solvent extraction of the lipase enzyme, such as 5 to 20 minutes. It is also important that the wash step be terminated before the unbroken, whole grain rice begins to break down and loose excessive amounts of starch. After the wash step, the wash liquid is drained and retained for further washes, thus concentrating the lipase enzyme in the wash liquid. As an additional benefit, the wash step hydrates the rice grains sufficiently for subsequent steps.

After washing, the unbroken, whole grain rice is wet ground in a wet mill until all the fat, protein, fiber, and starch components from the structure of the grain are liberated. Optionally, salt may be added during the milling process. Once the components have been liberated, the slurry composition may be optionally run through a sieving process that separates unwanted coarse or insoluble fiber from the slurry containing the liberated components. The sieving process is preferably accomplished using first a 150 mesh screen, followed by a 325 mesh screen. Additionally, the protein from the slurry may also be separated by centrifugal separation such as a Sharples Centrifugal separator for solids-solid separation. In this way the protein may be separated from the starch slurry.

The milled slurry containing the liberated components, whether or not some of these components have been removed, may be subsequently heated and dried. The milled slurry with released components may also be subjected to heat and enzymatic hydrolysis, such enzymatic hydrolysis can include liquefaction alone or in combination with saccharification to produce any desired carbohydrate distribution. Liquefaction is accomplished using an alpha-amylase enzyme having dextrinizing activity and which is produced from a microorganism selected from *Bacillus subtillus, Bacillus Stearothermophilus* and *Bacillus licheniformis* or a fungal source such as *Aspergillus oryzae* to yield a liquefied slurry. Optionally, an acceptable source of calcium may be added to provide the necessary co-factor for the liquefaction enzyme.

The liquefied slurry is heated, preferably to a temperature of about 180° F. for a predetermined amount of time, preferably 30 minutes and additional calcium carbonate may be added. The temperature of the liquefied slurry is then raised, preferably to about 220° F. for about 30 seconds in order to finish any un-gellatinized starches.

Finally, the liquefied slurry is cooled, preferably to 140° F., and saccharification enzymes are added, preferably alpha and beta amylases. The pH may be maintained at about the normal pH of rice, i.e., about 6.3, or may be adjusted to from 3.5 to 7.5. The saccharifying enzymes may include a glucosidase, which is glucose liberating and which is produced by a microorganism selected from many species of *Rhizopus* or *Bacillus*, strains of the *Aspergillus niger* group, *Aspergillus oryzae, Muco* species, *Endomyces* species, *Endomyces fibuliger, Saccharomyces diastaticus, Chlostridium acetobutylicum* or possibly a beta-amylase (which is maltose liberating) extracted from species of *Rhizopus*, for example or extracted from either barley, wheat, rye, sweet potatoes or soybeans. However, it is preferred that the maltose liberating enzyme that is used, is not from barley in an effort to be consistent with the hypo-allergenic nature of rice. The sources of glucosidase and beta-amylases enzymes used in the saccharification step are commonly available and known such that no further discussion is required.

The dosage level of added saccharification enzyme is anywhere from two to ten times that necessary for the analogous conversion of an equivalent amount of purified starch, the dosage level being dependent upon the quantity and type of sugar to be liberated. After the slurry has been allowed to react with the saccharifying enzyme(s) for a relatively short period of time (less than four hours), the slurry can then cooled as is to produce a smooth and creamy opaque milky suspension or sieved or centrifuged to remove residual unwanted fiber, and protein, or centrifuged to remove the fat-amylose complex. The residual translucent liquor having removed the fiber, protein, and fat-amylose complex, and having varying glucose and maltose content depending upon the quantity and type of saccharifying enzyme used, has the distinctive feature of not having any bitterness normally associated with aqueous extracts from brown rice. This liquor can then be concentrated using an evaporator to a concentrate having a solids content of between 60 and 85%. Additionally, this concentrate can be further dried by spray drying or drum drying, or pasteurized and immediately cooled to between 0 and 18° C. for use as a liquid.

Optionally, after the saccharification step, the solution may, without any removal of the protein, fiber, or fat-amylose complex, be pasteurized by heating, preferably to 180° F. for up to 10 minutes. The now pasteurized sweetened opaque liquor having substantially all the nutritional qualities of a whole grain such as brown rice, is finally cooled to less than 40° F. and forms a whole grain rice milk base of 26-30 Brix that can be diluted to form a beverage.

Accordingly, the process of the present invention initially involves the selection of relatively unbroken whole grain rice as a starting material. The unbroken whole grain rice is first washed and then subjected to aqueous wet milling to liberate the nutritional components held in the grain or its particles, and such liberated components may be optionally removed prior to heating to yield different derivative products, the residual components then being subjected to heat treatment and drying, or subsequently treated to enzymatic liquefaction preferably employing alpha-amylase enzyme to produce a liquid slurry. In order to prevent development of undesirable off-flavors, the enzymatic liquefaction step is preferably limited to no more than about one hour and preferably within 1 hour of the release of the components in the slurry. Thereafter, the liquid slurry may be subjected to a saccharification step employing a high level of enzymes on the order of two to ten times the quantity typically suggested for pure starch hydrolysis reactions, are used to overcome the pH, time and temperature conditions required by the enzymes, utilizing any enzyme system suitable for producing the desired carbohydrate distribution and level of sweetness of the product.

In order to achieve desired conversion while further preventing development of undesirable off-flavors due to microbiological action, the saccharification step is also limited, preferably to about three hours and more preferably within the range of about two to three hours.

It has further been found that the milk-like texture and functionality of the resulting rice milk product is enhanced if the pH of the saccharification step is maintained approximately equal to the pH of natural rice (about 6.3). Accordingly, the pH of the saccharification step is most preferably limited to the range of about 6 to 6.5.

However, it has further been found possible to generally maintain the desirable milk-like texture and functionality of the product even with the pH of the saccharification step being adjusted, generally toward acid levels. In this regard, it is often considered desirable to adjust the pH to a range of about 3.5 to 7 in order to enhance enzymatic activity. Accordingly, that range is a broader preferred range within the present invention.

The solids content of the whole grain milk may be adjusted to between 8 and 45% soluble solids by the addition of water to yield a milk-like beverage very similar in appearance and taste to milk.

The whole grain milk of this invention can also he used in the preparation of a novel frozen dessert. The whole grain rice milk is used as a replacement for both the milk and sugar in a standard ice cream mix. The whole grain milk is blended with from 0 to 12% by weight vegetable oil, from 0 to 1% by weight stabilizers, from 0 to 12% flavors, from 0 to 1% salt, the blend heated to between 65 and 70° C., homogenized at between 2,000 and 3,000 PSI, cooled to between 0 and 18° C., additional flavors added if desired and the mix frozen and packaged according to standard practice in ice cream manufacturing.

The whole grain rice milk provided in this invention can also be used in the preparation of other frozen desserts, puddings or whipped toppings by the replacement in standard formulations for milk solids, sugar solids, corn syrup solids and or moisture content by the whole grain milk.

The whole grain milk provided in this invention of varying starch, complex carbohydrates, glucose to maltose ratios may be dried to a powder form by using drum type dryers, spray dryers or the like. The resulting powder may then be ground or sifted, or agglomerated as needed to a size of between 4 and 300 mesh. This dried powder may then be used as a replacement for corn syrup solids, powdered milk, sweeteners, or any combination thereof. The whole grain milks may also be used as a source of complex carbohydrates.

Another application of the whole grain milk prepared by this new process is in the preparation of 100% whole grain solids concentrate by concentration of the whole grain milk. The whole grain milk is concentrated to between 40 and 50% solids by using a vacuum type evaporator, and subsequently spray or drum dried to produce a dried whole grain powder having substantially all the nutrition of the whole grain (including the bran layer).

Having outlined the steps in our invention we will now provide detailed examples of the process for preparing the whole grain milk products of this invention and examples of the whole grain milk products of varying carbohydrate distribution; Examples of the use of these whole grain milk products having different carbohydrate compositions will also be provided for a variety of food and beverage applications.

We will also provide detailed examples of the process for preparing derivatives from the whole grain milk process resulting from the removal of some of the components and examples of the derivative products resulting from the process. Examples of the use of these derivative products in food and beverages will be provided.

Additionally, examples demonstrating the preparation of a derivative of the whole grain milk process that is suitable for concentration to syrup having a solids contents of between 65 and 85% and examples of the syrup product itself will be provided. The use of the syrups as sweeteners in food and beverage products will also be provided.

Additionally, examples demonstrating the preparation of powdered whole grain rice milk and its derivatives along with the use of the powdered whole grain milk of this invention and its derivatives in the preparation of instant food and beverage products.

In the following examples the abbreviation "DSB" is referring to "Dry Substance Basis". Additionally the use of the phrase "whole grain rice" or "whole grain corn" specifically refers to the accepted definition of whole grain that contains all nutritional components of the grain endosperm and the bran layer.

EXAMPLE 1

Washed Whole Grain Rice Milk Slurry

To a 100 gallon agitated tank was added two hundred pounds of water at room temperature and one hundred pounds of whole grain brown rice that had been dehulled within the last 24 hours. This aqueous whole rice slurry was then gently agitated so as to wash the brown rice without damaging the bran layer. The slurry was agitated for 20 minutes and then the rice separated from the water by mechanical sifting over a 30 mesh screen.

The washed rice was then added back to the 100 gallon tank and two hundred pounds of fresh, 45° F. cold water was then added and the slurry immediately milled through a Silverson rotor stator type mill via a circulation loop through the mill. The slurry being milled until the components of protein, fiber, starch and fat had been fully released making sure to keep below the temperature of gelatinization of the starch or denaturization of the protein, and more preferably less than 75° F. Taking a sample of the slurry and centrifuging in a laboratory centrifuge confirms this liberation of the components. A clear separation of the very white liberated starch with no rice grains, a protein layer and a suspendable fat layer and dispersed fiber are clearly visible. Comparison to a coarse, 80 mesh, dry ground flour made from whole brown rice and suspended in water and centrifuged in the laboratory, clearly enables us to distinguish the difference between the slurry where the components are held in the structure of the whole grain rice and a slurry in which all the components have been liberated. The easily suspendable and stable slurry was found to have 28% total solids. By using different amounts of whole grain rice to water, slurries having increased or decreased total solids content may be achieved. However, for reasons of economic efficiency and production ease because of the deliquescent nature of starch slurries, a slurry having a final solids content of at least 8% and less than 45% is preferred, and a slurry of about 28 to 35% being most preferred. The composition was identical to that of the starting whole grain brown rice material. To confirm the liberation of the components, a small sample of the slurry was sifted through a 270 mesh screen to remove the fiber, the remaining slurry was subjected to centrifugation in a laboratory centrifuge and the layers separated: bottom layer was starch (bright white and passing through a 350 mesh screen); protein layer (beige, soft and creamy in appearance and considerably lighter than the starch layers and is present directly on top of the deliquescent and packed starch layer); fat layer (creamy, frothy, slick liquid floating on top of the centrifuged slurry). Each of the layers was easily separated and dried and had the following relative percent solids: 85% starch layer; 8% protein layer; 4% fiber removed by sifting; and 4% fat layer.

EXAMPLE 2

Pregelled Whole Grain Rice Milk

The washed whole grain Rice Milk concentrate slurry being prepared by the method shown in Example 1 but having a total solids of 40%, was then subjected to drum drying on a double roll drum heated by steam with the material being added to the pinch of the drums. The resulting dried material, having a moisture of 5% was then ground to less than 80 mesh. The product was free flowing and when suspended in water at a 10% solids solution, readily suspended the material and created a smooth, white suspension, that was opaque, and having essentially all complex carbohydrates with less than 1% glucose, and no sweetness in taste, and most importantly, no bitter aftertaste whatsoever. The viscosity was thick, similar to a milkshake.

EXAMPLE 3

Liquefied Whole Grain Rice Milk Concentrate

The washed whole grain rice milk slurry of Example 1 was first screened by sifting over a 150 mesh screen to remove coarse, insoluble fibrous material. One hundred pounds of the resulting slurry having a total solids of 28%, was then enzymatically liquefied by adding 40 cc of the high temperature alpha-amylase, HT-340L from Valley Research of South Bend, Ind., and subjecting the slurry to a temperature of 180° F. for 30 minutes followed by heating to greater than 220° F. for 5 minutes and cooling to a temperature of 170° F. The resultant enzymatically liquefied slurry, was an opaque colloidal suspension, having slight sweetness, suspendable solids, smooth, non-pulpy texture, fully opaque even when diluted to 5%, and without the bitterness normally associated with the whole grain. The glucose content on a dry substance basis was found to be 3% and the maltose content was found to be 10%.

EXAMPLE 4

Liquefied and Dried Whole Grain Rice Milk

The Whole Grain Rice Milk having 3% glucose resulting from the liquefaction in Example 3 above, and having 28% solids was pumped through a standard air atomized spray dryer having an inlet temperature of 120° C. and was collected as a white dry powder of approximately 60 to 300 mesh. The resulting free flowing dry powder material was easily re-dissolved in water to provide an opaque colloidal suspension, having slight sweetness, suspendable solids, smooth, non-pulpy texture, fully opaque even when diluted to 5%, and no bitter aftertaste normally associated with the whole grain. Analysis of this material showed the following composition: moisture—3%; protein—7.8%; fat—4%; total Dietary Fiber—1.2%; complex carbohydrates from starch—73%; glucose—3%; and maltose—8%.

The powdered form of the whole grain rice milk product of Example 4 can be used to replace milk or soy solids that contain allergens. The presence of complex carbohydrates, proteins, fats and minerals also make this powdered non-dairy milk a balanced hypoallergenic nutritional source.

The pre-gelled whole grain rice milk product of Example 2 has much less sweetening power than the dried product resulting from Example 4, but is a desirable source of complex carbohydrate or filler powder in formulations where a bland powder is required for bulking purposes and source of complex carbohydrates in additional to an increase in viscosity. The use of either of these dried whole grain rice milks may be utilized alone or in combination in food or beverage formulations to achieve the desired viscosity and relative sweetness of particularly low sweetness foods such as non-dairy beverages, yogurts, sour creams, cheeses, and the like.

EXAMPLE 5

Sweet Whole Grain Rice Milk

One hundred pounds of the 28% solids whole grain rice milk slurry of Example 1 was enzymatically liquefied by adding 40 cc of the high temperature alpha-amylase, HT-340L from Valley Research of South Bend, Ind., at the natural pH of the whole grain rice slurry with added 250 ppm calcium as the cofactor for the enzyme, and subjecting the slurry to a temperature of 180° F. for 30 minutes followed by heating to greater than 220° F. for 5 minutes and cooling to a temperature of 170° F. The resultant enzymatically liquefied slurry was then placed in a holding tank at 140° F. for the purpose of saccharification. To this holding tank was added 80 gram of glucosidase from Valley Research of South Bend, Ind. referred to as Validase GAPF and 20 gram of maltose producing enzyme referred to as Validase FAA from Valley Research of South Bend, Ind. It is preferable that the maltose producing enzyme is not from a barley source so as to be consistent with the hypoallergenic character of the whole grain rice milk products. The slurry was held in the saccharification tanks for at least 1 hour and preferably no longer than 4 hours, to ensure the desired conversion.

It is known by those skilled in the art that the use of different ratios of glucosidase (glucose producing enzymes) and beta amylases (maltose producing enzymes), as well as total amount of enzymes, may be employed to saccharify enzymatically-liquefied products to desired concentrations of glucose, maltose and complex carbohydrates within a given period of time. Any of these ratios and quantities may be employed successfully in this invention to produce the desired product without restrictions or requirements for specific amounts to achieve the final product. The amount and extent of saccharification only impacts the sweetness, and not the function or performance of the process as is the case in the prior art of Mitchell herein already described.

The whole grain rice milk product produced in Example 5, because of the additional sweetness that it provides, has advantages over qhole grain rice milk slurries of Example 1, pre-gelled whole grain rice milks of Example 2, or whole grain rice milks of Example 3 the latter having only been subjected to enzymatic liquefaction. Upon drying of the whole grain rice milk as produced in Example 5, by spray drying or drum drying techniques, a very sweet powder results which is acceptable for use as a sweetener in powdered food formulations and provides a more natural and nutritionally balanced sweetener. The composition of the dried product being: moisture—3%; protein—8%; fat—4%; total Dietary Fiber—5%; complex carbohydrates from starch—38%; glucose—20%; and maltose—20%.

EXAMPLE 6

Sweet Whole Grain Organic Corn Milk

To a 100 gallon agitated tank was added two hundred pounds of water at room temperature and one hundred pounds of whole grain corn that had been cracked or milled to a size sufficient to pass through a 14 mesh screen. Unlike whole grown rice, and specifically for whole grain corn, we found that it was not necessary to wash the corn as in the case of whole grain rice, and corn that had been reduced to a size of about 14 mesh via dry or cracking milling methods, was preferable as a starting material. The corn not having lipases that are readily liberated after de-hulling. This aqueous whole corn slurry was agitated for 20 minutes at 45° F., and preferably temperatures below 110° F. and above 35° F., more preferably around 45° F., and then the soaked corn slurry was milled through a Silverson rotor stator type mill via a circulation loop through the mill. The slurry being milled until the components of protein, fiber, starch and fat had been fully released. Taking a sample of the slurry and centrifuging in a laboratory centrifuge confirms this liberation of the components. A clear separation of the very white liberated starch with no corn grain of reduced size, a protein layer and a suspendable fat layer and dispersed fiber are clearly visible. Comparison to a coarse, 80 mesh approximately, dry ground flour made from whole corn and suspended in water and centrifuged in the laboratory, will clearly distinguish the difference between the slurry where the components are held in the structure of the whole grain corn and a slurry in which all the components have been liberated. The easily suspendable and stable slurry was found to have 28% total solids. By using different amounts of whole grain corn to water, slurries having increased or decreased total solids content may be achieved. However, for reasons of economic efficiency and production ease because of the deliquescent nature of starch slurries, a slurry having a final solids content of at least 10% and less than 45% is preferred, and a slurry of about 30 to 35% being most preferred. The composition was identical to that of the starting whole grain corn material. To confirm the liberation of the nutritional components, a small sample of the slurry was sifted through a 270 mesh screen to remove coarse fiber, the remaining slurry was subjected to centrifugation in a laboratory centrifuge and the layers separated: bottom layer was starch (bright white and passing through a 350 mesh screen); protein layer (beige, soft and creamy in appearance and considerably lighter than the starch layers and is present directly on top of the deliquescent and packed starch layer); fat layer (creamy, frothy, slick liquid floating on top of the centrifuged slurry). Each of the layers was easily separated and dried and had the following percent relative solids: 73% starch layer; 10% protein layer; 6% fiber removed by sifting; and 5% fat layer.

The whole grain corn slurry containing the liberated components was all then sifted through a 120 mesh screen to remove the coarse fiber. The resultant whole grain corn slurry was then subjected to enzymatic liquefaction and saccharification similar to the process as has already been described in Example 5. The saccharification enzymes used included a 37 gram glucosidase enzyme from Valley Research of South Bend, Ind. referred to as Validase GAPF, and 28 grams of a maltose producing enzyme, from Valley Research of south Bend, Ind. referred to as Validase FAA to produce a saccharified whole grain corn milk slurry having 60% DSB glucose and maltose. The corn milk slurry is characterized as having an opaque whole milk appearance, being smooth and non-pulpy and having a pleasant very sweet taste. The product is found to be suitable for food and beverage products similar to those described for whole grain rice milk. The composition of this whole grain corn milk slurry on a DSB basis was found to be: protein—10%; fat—5%; total dietary fiber—2%; complex carbohydrates from starch—21%; glucose—30%; and maltose—30%.

This whole grain corn slurry was then heated to 170° F. and centrifuged to remove the insoluble protein. Using an evaporator, the centrifuged saccharified whole grain corn milk was evaporated to 78% solids so as to produce a syrup made from whole grain corn.

The whole grain corn milk product produced in Example 6 has economic advantages over rice but also provides a significant method suitable for the manufacture of organic whole grain corn syrup products. Prior art teaches the soaking of the whole grain corn in a sulfite solution to soften the hull and promote the liberation of the components. Pure corn starch, having been liberated from the fat, fiber and protein, is then subjected to further liquefaction and saccharification. The liquefaction and saccharification of the whole grain corn, with or without having the fiber removed, has not been taught. We found the product resulting from this process as described is a colloidal milk like suspension that can be used as a whole grain corn milk product much like the whole grain rice milk product and eliminates the need or desire to first soften the whole corn in sulfite or other chemical solutions that enable the separation and refinement of the pure corn starch and the subsequent liquefaction and saccharification to produce a refined clear corn starch liquor.

Examples 2, 3, 4, 5 and 6 are representative of a broad range of whole grain rice and corn milk products that can be prepared according to the present invention. The products resulting from these Examples are representative of the invention in that they have surprising opacity more similar to whole milk, foaming properties, smooth non-spongy and non-pulpy texture even with the presence of protein and fiber, hypo-allergenic and not bitter. Furthermore, these products have retained substantially all the nutritional values present because of the whole grain employed as a starting material. The desirable properties of the products from these Examples are retained and provide advantages in the following Examples which make use of the products or teachings as provided in Example 2 through 6.

EXAMPLES 7-13 are further representative of some of the wide variety of food and beverage products which can be formed from whole grain rice milk product prepared for example in accordance with Examples 2 through 6. In particular, as is demonstrated by Examples 2 through 5, the rice milk product of the present invention particularly lend themselves to either drum drying or preferably spray drying in order to form a dried product which can either be used as is or stored and later reconstituted to form a liquid product.

EXAMPLE 7

Non-Dairy Pudding From Whole Grain Rice Milk

Eight grams of alginate (Protanal PM673; Protan, Drammen, Norway) were blended in a bowl with 500 g of the whole grain rice milk of EXAMPLE 5. The mixture being then vigorously agitated for one minute using a mechanical stirrer. The well mixed slurry was then allowed to cool for 30 to 45 minutes. A very acceptable pudding was produced.

Milk based puddings are produced by cooking milk, sugar and starch together. These milk puddings have soluble solids content approximately 30%. By using the whole grain rice milk product of Example 5, with approximately 40% DSB glucose and maltose, no sugar or sweetener need be added. Consequently, only the alginate, starch, gelling, or thickening agent need be considered to produce a very sweet non-dairy pudding of desired consistency. Therefore, the product has simple ingredient labeling being predominantly a rice milk product. Additionally, because the product contains substantially all the nutrients found in whole grain brown rice, a serving containing at least 25 grams of solids would be equivalent to a serving of whole brown rice.

EXAMPLE 8

Whole Grain Rice Non-Dairy Beverage Product

Using Example 3 a whole grain beverage product having none of the bitter taste associated with whole brown rice and providing substantially all of the nutrients associated with whole brown rice can be made. An eight ounce serving of the beverage product would provide substantially the same nutritional value as whole brown rice.

One liter of the Whole grain rice milk product of EXAMPLE 3 was diluted with cold water to obtain a total solids of 13%. To 1 liter of the above 13% soluble solids beverage were added 1.2 g. salt. No homogenization is required to achieve a milk like opaque and smooth suspension, however, if desired for particle uniformity, due to the presence of fiber and insoluble protein, the mixture could optionally be homogenized at 2,500 PSI. After homogenization, a pleasing milk-like beverage was produced being opaque, having the sweetness of milk, smooth in texture, fully suspendable and stays in suspension with only mild agitation, creamy even though no oil was added, and without the bitter taste normally associated with whole grain.

A major economic advantage of the whole grain rice milk is that it is not necessary to add any additional oil or homogenize the mixture because the oil from the whole grain bran layer in addition to the protein and maximum fat amylose complex are sufficient to form a very opaque while milk colloidal suspension. Additionally, because saccharification is not performed, the low sweetness when the slurry is diluted to 13% solids is equivalent to that normally expected for milk. The diluted product of Example 8 is very similar to whole fat cow's milk with regard to texture, mouthfeel, and sweetness.

EXAMPLE 9

Frostings and Nut butters

The dried whole grain rice milk from Example 4 was used as an extender of whole ground nuts to produce a rice/nut butter. Forty grams of the dried whole grain rice milk was blended thoroughly with 10 grams Palm Oil Stearin (48° C. melting point), then mixed with 50 grams of raw organic almond butter. The resulting product was smooth and creamy with the taste and texture similar to pure almond butter and having a water activity equal to 0.34.

The dried whole grain rice milk of Example 4 was used to make a dessert frosting. Sixty-one grams of the dried whole grain rice milk of Example 4 was blended thoroughly with 15 grams Palm Oil Stearin (48° C. melting point) and 0.1 gram salt; to this mixture blend was added 23 grams water and blended until smooth. The blend was smooth, creamy, and bland in flavor with no bitterness and behaved like a high fat frosting. The product was found to be microbially shelf stable having a water activity of 0.85. Flavors were optionally added to created vanilla, strawberry and lemon flavored frosting.

EXAMPLE 10

Instant Brownie Mix Containing Powdered Whole Grain Rice Milk Product

The following ingredients were blended to make a brownie mix: 200 g. powdered whole grain rice milk product of Example 5; 55 g. flour; 2.5 g. baking powder; 3.5 g. salt; and 25 g. cocoa powder.

Preparation of brownies using the above brownie mix: to the above mix were added 112 g. butter, one egg and 2 g. vanilla extract. The mixture was stirred until uniform, then poured into a greased 23×23 cm pan and baked 25 minutes at 175° C. A tasty brownie product was produced. This Example is representative of applications where the powdered rice milk product of Example 5 can be used to replace the sugar and milk of a standard brownie mix recipe.

EXAMPLE 11

Whole Grain Rice Milk Yogurt

The whole grain rice milk beverage product having 13% solids as obtained from Example 8 was heated to 180° F. degrees for 10 minutes and then cooled to 108° F. degrees to which was added a *Lactobacillus bulgaricus* culture. The wholegrain rice beverage and culture was allowed to stand for 12 hours at 108° F. degrees until the pH reached 4.4. The resultant cultured liquid was thickened using a blend of modified starch, gelatin and pectin to produce a yogurt type cultured product having a smooth and creamy texture similar to yogurt. Flavors or fruit may be optionally added to this yogurt base to produce products similar to dairy or soy type yogurt products. Additionally the whole grain rice milk yogurt is hypoallergenic and provide substantially all the nutritional value as in the whole grain rice.

EXAMPLE 12

Whole Grain Low Fat Non-Dairy Frozen Dessert

Four liters of the rice milk product of Example 5 (approximately 28% soluble solids) were blended with 100 g. safflower oil, 120 g. vanilla, 20 g. salt, and 20 g. carrageenan, the blend heated to 75° C. and homogenized at 2,500 PSI. The mix was then cooled to 18° C. and the mix packaged and frozen according to standard practice in ice cream manufacturing.

The frozen dessert outlined in Example 12 has a high freezing point depression resulting in a creamy product without crystalline brittleness caused by ice crystals. The ingredient declaration for this product is simplified since no added sweetener is required as is common with all other ice creams or frozen dessert products. Again, the rice milk product of Example 5 allows for the dilution by air of the non-dairy ice cream mix resulting in an increased economical advantage for the use of high glucose rice milk. Additionally the maximized amount of the fat-amylose complex and presence of all the fat and protein normally found in whole brown rice, along with the foaming functional character of the protein found in the whole brown rice creates a truly unique and improved Low Fat non-dairy whole grain frozen dessert containing substantially all the nutritional components of whole brown rice and requiring less added fat to make a frozen dessert typical to what is found in the industry.

EXAMPLE 13

Whole Grain Rice Milk Lattes

Whole grain rice milk obtained from Example 8 was heated with steam to create a frothy foam that was then added to espresso coffee to create a "latte". This example demonstrates the frothing and foaming ability resulting from the liberated proteins unique to the whole grain rice milk product of this invention.

The following Examples 14 through 16 are examples of derivatives of the whole grain milk process in which the protein, fiber, or fat-amylose components have been removed either alone or in combination to produce products having different properties and functions.

EXAMPLE 14

Brown Rice Syrup Derivative of Whole Grain Rice Milk process

A unique whole grain brown rice syrup was produced by taking the 100 pounds of the whole grain rice milk product of 28% solids from Example 5 after saccharification and heating to 180° F. followed by sifting over a 325 mesh screen to remove some of the very fine insoluble protein. The colloidal suspension having significant fat-amylose complex, was then evaporated under reduced pressure at 176° F. to a concentrated syrup having a solids content of 78% solids. This unique brown rice syrup was surprisingly found to be uniquely different from other colloidal syrups of prior art because of the total quantity of fat being present as the colloidal fat-amylose complex in addition to a total lack of bitterness. Additionally, the product was stable over long periods of time without resulting in any bitterness due to rancid oxidation of the fat present in the colloidal suspension. Further, presumably due to the higher quantity of fat-amylose present, the viscosity of the syrup was found to be less than colloidal prior art brown rice syrups having similar carbohydrate distribution and total solids. The whole grain brown rice syrup of this Example may be further dried preferably by spray drying to yield a dried whole grain brown rice syrup having no bitterness. The composition of this dried whole brain brown rice syrup is as follows: moisture—3%; protein—1.8%; fat—4%; total dietary fiber—1.2%; complex carbohydrates from starch—45%; glucose—22%; and maltose—22%.

EXAMPLE 15

Instant Chocolate Flavored Beverage Mix

The following ingredients were blended to make a non-dairy cocoa mix: 25 g. cocoa powder; 1.5 g. salt; and 120 g. dried whole grain brown rice syrup from Example 14.

The hot chocolate beverage of this Example was prepared by mixing the above components to form an instant chocolate flavored beverage mix. Eight hundred milliliters of boiling water were added with constant stirring. The mixture was beaten with a wire wisk prior to serving. The product of Example 15 illustrates how the whole grain brown rice syrup of Example 14 can be used as a replacement for the sugar a milk portion in a cocoa mix.

EXAMPLE 16

Fruit Beverage Product

A whole brown rice syrup similar to that described in Example 14 but having a DSB glucose content of 5%, maltose content of 10%, balance of carbohydrates being complex carbohydrates, and having a total solids of 85% was first prepared. The syrup being prepared by using the method set forth set-forth in Example 3 to achieve the liquefied whole grain rice milk product; taking such product after liquefaction and achieving the desired carbohydrate composition, heating the slurry to 170° F. followed by sifting of the slurry through a 325 mesh screen and thereafter concentrating the resulting colloidal liquor under reduced pressure at 176° F. to a total solid of 85%. The resulting syrup having very low sweetness and surprising low viscosity as compared to prior art grain hydrolysates having similar carbohydrate distribution and solids. The resulting syrup also being uniquely distinguished by producing an opaque colloidal suspension upon dilution to 10% solids while at the same time being uniquely absent in any bitter notes normally associated with brown rice syrups having a colloidal suspension. This syrup was then used to prepare a fruit type beverage. Sixty-four grams of this 85% solids syrup was diluted in 936 grams of water that was then adjusted with citric acid to pH 4 and a fruit punch flavor added. The resulting beverage was cloudy and had a pleasant "non-watery" mouthfeel as well as being absent of any bitter flavor.

The preferred embodiment of the invention is described above in the Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for producing a nutritional product, comprising the steps of:
    selecting as a starting material substantially unbroken whole grain rice;
    removing or deactivating lipase enzymes contained on or in the unbroken whole grain rice;
    wet milling, in an aqueous medium and at temperatures below starch gelatinization and protein denaturization temperatures, the unbroken whole grain rice so as to create a slurry comprising liberated fat, protein, fiber, and starch components; and
    heating the slurry containing the liberated components to temperatures above the protein denaturization temperature with no resulting fiber-protein agglomeration.

2. The method according to claim 1 further comprising the step of removing some of the liberated protein or fiber components prior to the step of heating the slurry.

3. The method according to claim 1 further comprising the step of drying the heated slurry containing the liberated components.

4. The method according to claim 2 further comprising the step of drying the heated slurry containing the liberated components.

5. The method according to claim 1 further comprising the step of liquefying the slurry containing the liberated components with an alpha-amylase enzyme in an aqueous medium substantially, in an amount and for a period of time which is sufficient to form a liquefied slurry and evaporating to form a concentrate of from about 40 to 85 percent solids.

6. The method according to claim 2 further comprising the step of liquefying the slurry containing the liberated components with an alpha-amylase enzyme in an aqueous medium substantially in an amount and for a period of time which is sufficient to form a liquefied slurry, removing from 0 to 100% insoluble protein, and evaporating to form a concentrate of from about 40 to 85 percent solids.

7. The method according to claim 5 further comprising the step of treating the liquefied slurry containing the liberated components with saccharifying enzymes sufficient to produce a desired carbohydrate distribution and desired sweetness for a period of time less than about three hours, which is sufficient to yield a rice milk product retaining substantially all the nutritional components from the whole grain and having a protein content of about 5 to 9% of the total solids and evaporating to form a concentrate of from about 40 to 85 percent solids.

8. The method according to claim 6 further comprising the step of treating the liquefied slurry containing the liberated components with saccharifiying enzymes sufficient to produce a desired carbohydrate distribution and desired sweetness for a period of time less than about three hours, which is sufficient to yield a rice milk product and having a protein content of about 5 to 9% of the total solids and evaporating to form a concentrate of from about 40 to 85 percent solids.

9. A whole grain rice milk product produced by process of:
    selecting as a starting material substantially unbroken whole grain rice;
    removing or deactivating lipase enzymes contained on or in the unbroken whole grain rice;
    wet milling, in an aqueous medium and at temperatures below starch gelatinization and protein denaturization temperatures, the unbroken whole grain rice so as to create a slurry comprising liberated fat, protein, fiber, and starch components; and
    heating the slurry containing the liberated components to temperatures above the protein denaturization temperature with no resulting fiber-protein agglomeration, said whole grain rice milk product having substantially all of the fat of the whole grain rice and absence of any rancid bitter taste.

10. The whole grain rice milk product according to claim 9 where the process further comprises the step of removing some of the liberated protein or fiber components prior to the step of heating the slurry.

11. The whole grain rice milk product according to claim 9 where the process further comprises the step of drying the heated slurry containing the liberated components.

12. The whole grain rice milk product according to claim 10 where the process further comprises the step of drying the heated slurry containing the liberated components.

13. The whole grain rice milk product according to claim 9 where the process further comprises the step of liquefying the slurry containing the liberated components with an alpha-amylase enzyme in an aqueous medium substantially, in an amount and for a period of time which is sufficient to form a liquefied slurry and evaporating to form a concentrate of from about 40 to 85 percent solids.

14. The whole grain rice milk product according to claim 10 where the process further comprises the step of liquefying the slurry containing the liberated components with an alpha-amylase enzyme in an aqueous medium substantially, in an amount and for a period of time which is sufficient to form a liquefied slurry, removing from 0 to 100% insoluble protein, and evaporating to form a concentrate of from about 40 to 85 percent solids.

15. The whole grain rice milk product according to claim 13 where the process further comprises the step of treating the liquefied slurry containing the liberated components with saccharifiying enzymes sufficient to produce a desired carbohydrate distribution and desired sweetness for a period of time less than about three hours, which is sufficient to yield a rice milk product retaining substantially all the nutritional components from the whole grain and having a protein content of about 5 to 9% of the total solids and evaporating to form a concentrate of from about 40 to 85 percent solids.

16. The whole grain rice milk product according to claim 14 where the process further comprises the step of treating the liquefied slurry containing the liberated components with saccharifiying enzymes sufficient to produce a desired carbohydrate distribution and desired sweetness for a period of time less than about three hours, which is sufficient to yield a rice milk product and evaporating to form a concentrate of from about 40 to 85 percent solids.

17. A method for producing a nutritional product, comprising the steps of:
    selecting as a starting material substantially unbroken whole grain or seed;
    removing or deactivating the lipase enzymes on the whole grain or seed;
    dividing the whole grain or seed by cracking or milling to particles of reduced size;
    wet milling, in an aqueous medium and at temperatures below starch gelatinization and protein denaturization temperatures, the divided whole grain or seed so as to create a slurry comprising liberated fat, protein, fiber, and starch components; and
    heating the slurry containing the liberated components to temperatures above the protein denaturization temperature with no resulting fiber-protein agglomeration.

18. The method according to claim 17 further comprising the step of removing some of the liberated components prior to the step of heating the slurry.

19. The method according to claim 17 further comprising the step of drying the heated slurry containing the liberated components.

20. The method according to claim 18 further comprising the step of drying the heated slurry containing the liberated components.

21. The method according to claim 17 further comprising the step of liquefying the slurry containing the liberated components with an alpha-amylase enzyme in an aqueous medium substantially, in an amount and for a period of time which is sufficient to form a liquefied slurry and evaporating to form a concentrate of from about 40 to 85 percent solids.

22. The method according to claim 18 further comprising the step of liquefying the slurry containing the liberated components with an alpha-amylase enzyme in an aqueous medium substantially, in an amount and for a period of time which is sufficient to form a liquefied slurry, removing from 0 to 100% insoluble protein, and evaporating to form a concentrate of from about 40 to 85 percent solids.

23. The method according to claim 21 further comprising the step of treating the liquefied slurry containing the liberated components with saccharifiying enzymes sufficient to produce a desired carbohydrate distribution and desired sweetness for a period of time less than about three hours, which is sufficient to yield a grain or seed milk product retaining substantially all the nutritional components from the whole grain or seed and evaporating to form a concentrate of from about 40 to 85 percent solids.

24. The method according to claim 22 further comprising the step of treating the liquefied slurry containing the liberated components with saccharifiying enzymes sufficient to produce a desired carbohydrate distribution and desired sweetness for a period of time less than about three hours, which is sufficient to yield a grain or seed milk product and evaporating to form a concentrate of from about 40 to 85 percent solids.

25. A whole grain or seed milk product produced by process of:
    selecting as a starting material substantially unbroken whole grain or seed;
    washing or deactivating the lipase enzymes on the whole grain or seed;
    dividing the whole grain or seed by cracking or milling to particles of reduced size;
    wet milling, in an aqueous medium and at temperatures below starch gelatinization and protein denaturization temperatures, the divided whole grain or seed so as to create a slurry comprising liberated fat, protein, fiber, and starch components; and
    heating the slurry containing the liberated components to temperatures above the protein denaturization temperature with no resulting fiber-protein anglomeration, said whole grain or seed milk product having substantially all of the fat of the whole grain or seed and absence of rancid bitterness.

26. The whole grain or seed milk product according to claim 25 where the process further comprises the step of removing some of the liberated components prior to the step of heating the slurry.

27. The whole grain or seed milk product according to claim 25 where the process further comprises the step of drying the heated slurry containing the liberated components.

28. The whole grain or seed milk product according to claim 26 where the process further comprises the step of drying the heated slurry containing the liberated components.

29. The whole grain or seed milk product according to claim 25 where the process further comprises the step of liquefying the slurry containing the liberated components with an alpha-amylase enzyme in an aqueous medium substantially, in an amount and for a period of time which is sufficient to form a liquefied slurry and evaporating to form a concentrate of from about 40 to 85 percent solids.

30. The whole grain or seed milk product according to claim 26 where the process further comprises the step of liquefying the slurry containing the liberated components with an alpha-amylase enzyme in an aqueous medium substantially, in an amount and for a period of time which is sufficient to form a liquefied slurry, removing from 0 to 100% insoluble protein, and evaporating to form a concentrate of from about 40 to 85 percent solids.

31. The whole grain or seed milk product according to claim 29 where the process further comprises the step of treating the liquefied slurry containing the liberated components with saccharifiying enzymes sufficient to produce a desired carbohydrate distribution and desired sweetness for a period of time less than about three hours, which is sufficient to yield a whole grain or seed milk product retaining substantially all the nutritional components from the whole grain or seed and evaporating to form a concentrate of from about 40 to 85 percent solids.

32. The whole grain or seed milk product according to claim 30 where the process further comprises the step of treating the liquefied slurry containing the liberated components with saccharifiying enzymes sufficient to produce a desired carbohydrate distribution and desired sweetness for a period of time less than about three hours, which is sufficient to yield a whole grain or seed milk product retaining the nutritional components from the whole grain or seed and evaporating to form a concentrate of from about 40 to 85 percent solids.

33. A liquefied whole grain rice milk product comprising fat at 3 to 5% of the total solids from rice, absence of any bitter taste.

34. The liquefied whole grain rice milk according claim 33 in a form of a concentrate of from 40 to 85% solids.

35. The liquefied whole grain rice milk according claim 34 further dried to a solid material having a moisture of less than 5%.

36. A food or beverage composition comprising at least one milk selected from the group consisting of milks according to claims anyone of 9-16 or 25-35.

* * * * *